United States Patent [19]

Schmidt

[11] Patent Number: 4,461,863
[45] Date of Patent: Jul. 24, 1984

[54] PROCESS FOR CONCENTRATING AQUEOUS DISPERSIONS OF POLYMERS OF CONJUGATED DIENES

[75] Inventor: Adolf Schmidt, Cologne, Fed. Rep. of Germany

[73] Assignee: Bayer Aktiengesellschaft, Leverkusen, Fed. Rep. of Germany

[21] Appl. No.: 444,068

[22] Filed: Nov. 24, 1982

[30] Foreign Application Priority Data

Dec. 4, 1981 [DE] Fed. Rep. of Germany ....... 3148105

[51] Int. Cl.$^3$ .............................................. C08K 5/42
[52] U.S. Cl. .................................... 524/157; 524/534; 524/745; 524/502
[58] Field of Search ........................ 524/157, 502, 534

[56] References Cited

U.S. PATENT DOCUMENTS

| | | | |
|---|---|---|---|
| 2,936,295 | 5/1960 | Brodkey et al. | 524/157 |
| 3,055,853 | 9/1962 | Pickell | 524/157 |
| 3,228,906 | 1/1966 | Schluter et al. | 524/502 |
| 3,364,165 | 1/1968 | Zimmerman | 524/157 |
| 4,327,004 | 4/1982 | Schmidt et al. | 524/819 |

FOREIGN PATENT DOCUMENTS

| | | | |
|---|---|---|---|
| 964476 | 7/1964 | Fed. Rep. of Germany | 524/157 |
| 143266 | 8/1980 | Fed. Rep. of Germany | 524/157 |

*Primary Examiner*—Joseph L. Schofer
*Assistant Examiner*—N. Sarofim
*Attorney, Agent, or Firm*—Connolly and Hutz

[57] ABSTRACT

The invention relates to a process for the production of an aqueous dispersion, fluid under normal conditions, based on homo- and co-polymers of conjugated dienes and having solids contents of from 35 to 55%, by weight, and average particle diameters of from 20 to 150 nm from an aqueous dispersion based on homo- and co-polymers of conjugated dienes which has been obtained by conventional methods, is fluid under normal conditions and does not contain alkane polysulphonates, having a solids content of from 25 to 35%, by weight, and average particle diameters of from 20 to 150 nm by concentration in the presence of a water-soluble salt of at least one alkane polysulphonate.

6 Claims, No Drawings

PROCESS FOR CONCENTRATING AQUEOUS DISPERSIONS OF POLYMERS OF CONJUGATED DIENES

This invention relates to a process for the production of an aqueous dispersion, fluid under normal conditions, based on one or more homo- and/or co-polymers of conjugated dienes and having solids contents of from 35 to 55%, by weight, and average particle diameters of from 20 to 150 nm from an aqueous dispersion based on one or more homo- and/or co-polymers of conjugated dienes which has been produced by conventional methods, is fluid under normal conditions and does not contain alkane polysulphonate, having a solids content of from 25 to 35%, by weight, by concentration in the presence of a water-soluble salt of at least one alkane polysulphonate.

It is known that, to produce aqueous homo- and co-polymer dispersions based on butadiene by polymerisation, certain quantities of electrolytes, such as potassium chloride, always have to be used in order to obtain a fluid, non-pasty latex (dispersion), cf. Houben-Weyl, Methoden der organischen Chemie, Vol. 14/1, 1961, page 722, line 4). Thus, the formulations for conventional cold rubber mixtures (cf Houben-Weyl, Methoden der organischen Chemie, Vol. XIV/1, 1961, page 716 and 717) and also for amine-activated mixtures (cf Houben-Weyl, 1961, Vol XIV/1, page 727) always contain electrolytes, such as potassium chloride or alkali metal phosphates. In addition, sodium salts of naphthalene sulphonic acids condensed with formaldehyde are used as polymerisation aids.

It is possible by these polymerisation processes to obtain latices having particle sizes of about 50 nm and solids contents of from 25 to 30%, by weight, which flow freely under normal conditions. However, if the solids content is increased significantly beyond 30%, by weight, these mixtures also become pasty. One possible way of overcoming this disadvantage would be to increase the electrolyte content and/or the content of naphthalene sulphonic acids condensed with formaldehyde.

However, an increase in the electrolyte content beyond the quantities normally used results in undesirable coagulation and also in a drastic reduction in the polymerisation velocity. Increased quantities of the sodium salts of naphthalene sulphonic acids condensed with formaldehyde contribute towards undesirably darkening the colour of the latices. Another disadvantage of these condensation products lies in the inadequate biodegradability thereof which creates effluent problems.

An object of the present invention is to produce from aqueous dispersions based on homo- and co-polymers of conjugated dienes which have been obtained by conventional polymerisation processes and which flow freely under normal conditions, having solids contents of from 25 to 35%, by weight, and a latex particle diameter of from 20 to 150 nm, corresponding coagulate-free dispersions which flow freely under normal conditions and which have a solids content of from 35 to 55%, by weight, without a significant change in the size of the particles. Naturally, the additives required for achieving this object should not darken the dispersions or cause serious foaming or give rise to additional problems in terms of effluent treatment, i.e. they should be biologically degradable.

According to the present invention, this object is achieved in that a small quantity of water-soluble salt of at least one alkane polysulphonate is dissolved in an aqueous dispersion based on homo- and co-polymers of conjugated dienes which has been produced by conventional methods, flows freely under normal conditions and does not contain alkane polysulphonate salts, having a solids content of from 25 to 35%, by weight, and a latex particle diameter of from 20 to 150 nm, and water is removed from the dispersion until the required solids content is obtained.

Although it is known, inter alia, from German Offenlegungsschrift No. 3,012,821 that polybutadiene and polychloroprene latices having solids contents in excess of 50%, by weight, may be obtained by using an emulsifier system, of which from 50 to 100%, by weight, consists of the alkali metal salt of an alkane polysulphonate, in the conventional quantities (e.g., from 1 to 5%, by weight, based on monomer) in the polymerisation reaction, the latices obtained flow freely under normal conditions on account of the coarseness of the particles (average latex particle diameter from 150 to 500 nm). According to German Offenlegungsschrift No. 3,012,821, the diameter of the polymer particles in the dispersion is increased during polymerisation with an increasing percentage of alkali metal salts of an alkane polysulphonate in the emulsifier system to such an extent that coarse and hence free-flowing dispersions of high solids content are formed without coagulation.

However, it was neither apparent from nor suggested by the above-mentioned German Offenlegungsschrift that a small addition of a water-soluble salt of an alkane polysulphonate to an aqueous dispersion based on homo- and co-polymers of conjugated dienes which has been obtained by conventional methods, flows freely under normal conditions and does not contain alkane polysulphonate salts would enable the solids content of such a dispersion to be drastically increased and its fluidity to be maintained by concentration without coagulation and foaming and without a change in the size of the latex particles.

Accordingly, the present invention relates to a process for the reduction of an aqueous dispersion, fluid under normal conditions, based on homo- and co-polymers of conjugated dienes and having solids contents of from 35 to 55%, by weight, and average latex particle diameters of from 20 to 150 nm, characterised in that from 0.05 to 5%, by weight, based on polymer, of a water-soluble salt of at least one alkane polysulphonate in the form of a dilute aqueous solution is uniformly dispersed in an aqueous dispersion based on homo- and co-polymers of conjugated dienes which has been obtained by conventional methods, flows freely under normal conditions and does not contain alkane polysulphonate salts, having a solids content of from 25 to 35%, by weight, and average latex particle diameters of from 20 to 150 nm, and is dissolved in the aqueous phase of the dispersion, and in that water is removed until the required solids content is obtained.

In the context of the present invention, the expression "fluid under normal conditions" is to be understood to mean a viscosity of less than 50,000 mPas, more particularly less than 30,000 mPas, as measured at atmospheric pressure (approximately 1 bar) and 22° C. (room temperature) in a Brookfield Rotation Viscosimeter, No. 4 spindle, at 6 r.p.m. (revolutions per minute).

The dispersions obtained in accordance with the present invention and used for the present process preferably have an average latex particle diameter of from 25 to 100 nm, in other words they contain extremely fine particles.

The conjugated dienes preferably contain from 4 to 6 carbon atoms and may be substituted by one or two chlorine atoms. Butadiene, isoprene and chlorobutadiene (chloroprene) are preferred, butadiene being particularly preferred.

In addition to polymerised diene units, the copolymers of the conjugated dienes contain copolymerised units of, preferably, acrylonitrile, styrene, methyl styrene, (meth)acrylic acid esters preferably containing from 1 to 4 carbon atoms in the alcohol component, (meth)acrylic acid or mixtures thereof, itaconic acid, more particularly copolymerised units of acrylonitrile and/or styrene.

The homopolymers of the conjugated dienes are preferred, butadiene being particularly preferred.

The free-flowing aqueous dispersions of homo- and co-polymers of conjugated dienes which are used for the process according to the present invention are obtained by conventional methods using conventional auxiliaries (for example initiators, emulsifiers, regulators, electrolytes, heavy metal catalysts), cf Houben-Weyl, Methoden der organischen Chemie, Vol. XIV/1, 1961, pages 630 to 752, or D. C. Blackley's book entitled "Emulsion Polymerisation", Applied Science Publishers Ltd., 1975, London. They are always substantially free from salts of an alkane polysulphonate. The solids content thereof amounts to from 25 to 35%, by weight, and the average latex particle diameter thereof to from 20 to 150 nm, preferably from 25 to 100 nm.

The alkane polysulphonic acids on which the salts of the alkane polysulphonic acids used in accordance with the present invention are based contain 2 or more sulphonic acid groups, preferably from 2 to 4, more preferably 2 or 3 sulphonic acid groups per molecule. The alkane radical of the alkane polysulphonic acid is linear or branched and contains on average from 8 to 22 carbon atoms, preferably from 13 to 17 carbon atoms. It is preferred to use a mixture of the alkane polysulphonic acids described above.

Preferred water-soluble salts of alkane polysulphonic acids are metal salts, more particularly alkali metal salts. Of the alkali metal salts, mention is made of the sodium and potassium salts, particularly the sodium salts.

The production of the alkane polysulphonic acids and the salts thereof is known. For example, they may be obtained by sulphochlorination of the alkanes, followed by hydrolysis with a base (cf Chemie und Technologie der Paraffin-Kohlenwasserstoffe, Akademie Verlag, Berlin, 1956, pages 395 to 474). The corresponding salts may be obtained by reacting the alkane polysulphonic acids with metal hydroxides. In many cases, the alkane polysulphochlorides are hydrolysed with twice the stoichiometric quantity of metal hydroxide which is required for hydrolysis, the corresponding metal salts of the alkane polysulphonic acid being obtained in addition to the corresponding metal chloride in a single stage.

In most cases, the alkane polysulphonates obtained during the substantially complete sulphochlorination step and the subsequent hydrolysis step still contains small quantities of alkane monosulphonates which may be separated off, for example, by extraction with diethyl ether or alcohols. However, they may also remain in the reaction mixture. Accordingly, the salts of alkane polysulphonates used in accordance with the present invention may contain up to 20%, by weight, of salts of the corresponding alkane monosulphonates. In the context of the present invention, therefore, the expression "alkane polysulphonate" includes alkane polysulphonates containing up to 20%, by weight, of alkane monosulphonate.

The salts of the alkane polysulphonates may be used in the form of from 5 to 65%, by weight preferably from 8 to 10%, by weight, aqueous solutions.

The aqueous solutions of the salts of the alkane polysulphonates are added continuously or at intervals to the aqueous dispersions, fluid under normal conditions, based on homo- and co-polymers of conjugated dienes with intensive stirring at any time after polymerisation is over or before polymerisation is over, uniformly dispersed by continued stirring and, at the same time, dissolved in the aqueous phase of the dispersion.

The water is removed from the dispersion by conventional methods, such as distillation, preferably in vacuo, freeze drying or creaming, filtration, centrifuging, electrodecantation (cf Houben-Weyl, Methoden der organischen Chemie, Vol. XIV/1, 1961, pages 515–530).

The dispersions obtained in accordance with the present invention are suitable for use as binders for the impregnation of sheet-form textile materials and for the impregnation and consolidation of fibre-based non-wovens. They may also be used as preliminary stages in the production of high-impact plastics and are capable both of chemical and of physical agglomeration.

The parts and percentages quoted in the Examples are parts and percentages, by weight, unless otherwise indicated.

A. Production of a sodium alkane polysulphonate
(starting material)

A mixture of linear alkanes (from 8 to 20 carbon atoms in the molecule, average number of carbon atoms 15) is sulphochlorinated in the presence of light with a gas mixture consisting of 1.1 part of sulphur dioxide and 1.0 part of with stirring and cooling at a temperature of from 30° to 40° C. Sulphochlorination is continued until the reaction mixture has a density of 1.250 g/cc at 45° C. By this time, the sulphochlorine content amounts to from 18.0 to 18.5%, by weight, 200 g of the sulphonation mixture are added dropwise to 170 g of 50%, by weight, sodium hydroxide which has been heated to from 50° to 60° C. The reaction mixture is maintained at a temperature of from 95° to 100° C. by cooling. On completion of the reaction, the reaction mixture is adjusted to a pH of from 9 to 10 by the addition of concentrated sodium hydroxide. The reaction mixture is then cooled to from 60° to 70° C.

Sodium chloride precipitates in this temperature range and is removed by filtration or centrifuging. The solution free from sodium chloride is evaporated to dryness under vacuum. A mixture of 8 g of NaCl and 139 g of sodium alkane sulphonate is obtained. The sodium alkane sulphonate consists of 13.2%, by weight, of sodium alkane monosulphonate and 86.8%, by weight, of sodium alkane polysulphonate.

According to the present invention, this mixture of substances (sodium alkane polysulphonate A-1), consisting of sodium alkane polysulphonate, sodium alkane monosulphonate and a little sodium chloride, may be used without further purification in the form of an aqueous solution (sodium alkane polysulphonate solution A-1).

If the dispersion is to remain at as low a salt content as possible, it is possible to use a sodium alkane polysulphonate purified, for example, by the following procedure:

The above mixture (sodium alkane polysulphonate A-1) is first finely powdered.

100 parts of the resulting dry powder are then stirred intensively for 120 minutes at 40° C. with 100 parts of anhydrous ethanol, approximately 13% of the mixture passing into solution. After the main fraction which has remained undissolved has been filtered off under suction, the operation is repeated with the same quantity of ethanol. An approximately 8% ethanol solution is obtained after the second extraction.

The two ethanol extracts contain the sodium alkane monosulphonate present in the original mixture and a percentage of polysulphonate.

100 parts of the residue pretreated with ethanol are treated under reflux for 10 hours with intensive stirring with 650 parts of anhydrous methanol, after which the solution is filtered off still hot from the sodium chloride remaining behind.

The methanol filtrate is concentrated to dryness by evaporation in vacuo (rotary evaporator) and the residue is powdered. Aqueous solutions for use in accordance with the present invention may be prepared from it.

B. Preparation of a 32% polybutadiene dispersion (starting material)

The following components are introduced under nitrogen (approximately 1 bar) at +5° C. into a 40 liters fine-steel autoclave:

| | |
|---|---|
| Deionised water | 8500 g |
| 5% aqueous potassium oleate solution | 5250 g |
| Anhydrous potassium sulphate | 49 g |
| Iron (II) sulphate solution, 0.25 molar complexed with the tetrasodium salt of ethylene diamine tetraacetic acid | 10 g |
| p-methane hydroperoxide, 50% as supplied | 15.6 g |
| n-dodecyl mercaptan | 39 g |
| Butadiene | 9500 g |

As soon as the system has reached a constant temperature, polymerisation is initiated by the addition of a solution consisting of

| | |
|---|---|
| Deionised water | 1000 g |
| Sodium formaldehyde sulphoxylate | 7.8 g | and the temperature regulated to 5° C. (in the latex).

After the activator solution has been added, samples are taken at hourly intervals through a base valve, inhibitors having been introduced beforehand into the sample vessels (approximately 50 mg of diethyl hydroxylamine for a 50 g sample).

The solids contents of the samples, the pH, the electrical conductivity and the particle diameter thereof are shown in Table 1. The particle sizes were determined by laser correlation spectroscopy (LCS), cf D. E. Koppel, Journal of Chemical Physics 57, 1972, pages 4814–4820. LCS gives somewhat larger values than ultracentrifuges or electron microscopes. The factor by which the LCS diameter has to be multiplied to come up to the diameters as measured by the ultracentrifuge method from the particle count is of the order of 0.85 (for particle size analysis, cf DIN 53 206, sheet 1, page 5).

TABLE 1

| Sample No. | Time (h) hours | Solids content (% by wt.) | Quantity of polymer (g) | Conversion (%) | Latex particle diameter (nm) $1\,nm = 10^{-9}\,m$ | Number of particles in the latex | pH | Electrical conductivity (mS) mS = Millisiemens |
|---|---|---|---|---|---|---|---|---|
| 1 | 1 | 3,3 | 128 | 1,3 | — | — | 10,6 | 5,7 |
| 2 | 2 | 6,9 | 710 | 7,5 | | | | 5,3 |
| 3 | 3 | 10,3 | 1295 | 13,7 | 40 | $4,3 \times 10^{19}$ | | 5,2 |
| 4 | 4 | 13,4 | 1880 | 19,8 | 45 | $4,4 \times 10^{19}$ | 10,5 | 5,2 |
| 5 | 5 | 16,4 | 2480 | 26,1 | 46 | $5,4 \times 10^{19}$ | | 5,1 |
| 6 | 6 | 18,5 | 2925 | 30,8 | 50 | $5,0 \times 10^{19}$ | | 5,0 |
| 7 | 7 | 20,7 | 3420 | 36,0 | | | | 4,9 |
| 8 | 8 | 22,4 | 3820 | 40,2 | 52 | $6,5 \times 10^{19}$ | 10,4 | 4,8 |
| 9 | 9 | 24,2 | 4260 | 44,9 | | | | 4,7 |
| 10 | 10 | 25,9 | 4700 | 49,5 | 53 | $6,7 \times 10^{19}$ | 10,4 | 4,6 |
| 11 | 11 | 26.9 | 4970 | 52,3 | | | | 4,5 |
| 12 | 12 | 27,8 | 5215 | 54,9 | 54 | $7,0 \times 10^{19}$ | | 4,5 |
| 13 | 13 | 28,6 | 5440 | 57,3 | | | | 4,4 |
| 14 | 14 | 29,5 | 5700 | 60,0 | 55 | $7,3 \times 10^{19}$ | 10,3 | 4,3 |
| 15 | 15 | 29,8 | 5785 | 60,9 | | | | 4,3 |
| 16 | 16 | 30 | 5840 | 61,5 | | | | 4,1 |
| 17 | 19 | 32 | 6460 | 68 | 57 | $7,4 \times 10^{19}$ | 10,3 | 4,0 |

Table 1 also shows the quantity of polymer in g which is obtained by calculation from the solids contents of the latices and also the conversion which is defined as the ratio between the quantity of polymer and the total quantity of monomers multiplied by 100.

The number of particles in the latex is calculated from the measured particle size and the quantity of polymer. The electrical conductivity was measured using an apparatus which indicated the conductivity of highly pure potassium chloride in distilled water as follows:

0.0745 g of KCl per liter; C (mole/l): $10^{-3}$ 0.12 mS
0.746 g of KCl per liter; C (mole/l): $10^{-2}$ 1.3 mS
7.456 g of KCl per liter; C (mole/l): $10^{-1}$ 11.2 mS It may be seen from the Table that the number of particles initially increases during polymerisation and subsequently remains substantially constant. The pH and, in particular, the electrical conductivity decrease during polymerisation.

The approximately 32%, substantially coagulate-free latex thus obtained has the following characteristic data after removal of the residual monomer by stirring in vacuo (at room temperature):

pH: approximately 10 (as measured using a calibrated pH-meter) at 22° C.

Electrical conductivity: approximately 4 Millisiemens (mS) at 22° C.

Flow-out time: from 17 to 18 seconds at 22° C., as measured using a 4 mm-orifice cup according to DIN 53 211

Viscosity: approximately 30 mPas as measured (like all other determinations herein) by means of a Brookfield Synchro-Lectric viscosimeter, model LVF, a precision instrument manufactured by Messrs Brookfield Engin. Laboratories Inc. using the numbers 1 to 4 spindles supplied with this instrument at various rotational speeds (6, 12, 20, 60 revolutions per minute) at 22° C.

The polymer on which the latex is based is largely soluble in toluene and has a viscosity number [η] of 3.9 [100 ml/g], as measured in toluene at 25° C. The gel content amounts to approximately 15%.

Latex particle diameter: 57 nm, as measured by LCS, corresponding to from 45 to 50 nm according to ultracentrifuge measurements.

C. Production of a butadiene-styrene latex (starting material)

The following components are introduced under nitrogen (approximately 1 bar) into a 40 liter fine-steel autoclave:

| | |
|---|---|
| Deionised water: | 12,750 g |
| 15% potassium oleate solution: | 4,516 g |
| p-methane hydroperoxide (50% as supplied): | 25 g |
| t-dodecyl mercaptan: | 14.4 g |
| 0.25 molar aqueous solution of iron (II) sulphate complexed with the tetrasodium salt of ethylene diamine tetraacetic acid: | 15 g |
| Butadiene: | 5,600 g |
| Styrene: | 2,400 g |

As soon as the system has reached a constant temperature of +5° C., polymerisation is initiated by the addition of a solution consisting of

| | |
|---|---|
| Deionised water | 1000 g |
| Sodium formaldehyde sulphoxylate | 7.8 g | the temperature being maintained at 5° C., as measured in the latex, by external cooling.

After this activator solution has been added, samples are taken at certain intervals, inhibitors having been introduced into the sample vessels (approximately 50 mg of diethyl hydroxylamine for a 50 g sample).

The solids content of the samples, the electrical conductivity, the latex particle diameter, as measured by LCS, are determined and the particular quantity of polymer present (in g), the conversion (in %) and the number of particles in the latex are calculated from the results obtained (cf Table 2).

About 7½ hours after the sodium formaldehyde sulphoxylate solution has been added, the temperature as measured in the latex increases despite external cooling with brine (approximately −15° C.) and, after about 9 hours, reaches a maximum of approximately +12° C. After 14 hours, the monomer conversion has reached 97% and the reaction is stopped by the addition of 10 g of diethyl hydroxylamine dissolved in 200 g of water, the reaction mixture run off and thoroughly stirred in vacuo at room temperature to remove residual butadiene. Characteristic date of the viscous latex (approximately 25 kg):

Coagulate content: approximately 2.5 g

Solids content: 32.5%

Electrical conductivity: approximately 3.5 mS

Viscosity: 12,900 mPas as measured with a Brookfield rotation viscosimeter, No. 4 spindle, at 6 revolutions per minute at 22° C.

The polymer on which the latex is based forms a largely clear solution in toluene, has a gel content of approximately 5% and an intrinsic viscosity [η] of 3.5 [100 ml/g], as measured in toluene at 25° C.

The latex particle diameter of the dispersion, as measured by laser correlation spectroscopy, amounts to from 55 to 60 nm, corresponding to from 45 to 50 nm as measured by ultracentrifuge.

EXAMPLE 1 (according to the present invention)

1.6 parts of a 20% polysulphonate solution according to A-1 are added with intensive stirring to 100 parts of the 32% polybutadiene latex prepared in accordance with B.

Thereafter, water is distilled off from this polysulphonate-containing dispersion in a water jet vacuum at an internal temperature of 50° C. until the dispersion has a solids content of approximately 45%.

As may be seen from Table 3, lower section, the viscosity of the latex increases as a result of concentration to approximately 800 mPas, as measured by means of a Brookfield viscosimeter, No. 4 spindle, at 6 to 30 r.p.m.

However, the latex is free-flowing and has a flow-out time of 14 seconds, as measured with a 6 mm orifice cup in accordance with DIN 53 211. The size of the latex particles was not significantly changed and a diameter of 57 nm was measured by LCS.

COMPARISON EXAMPLE 1

1.6 parts of water are added with intensive stirring to 100 parts of the 32% polybutadiene latex prepared in accordance with B.

Thereafter, water is distilled off in a water jet vacuum from this disposition slightly diluted with water until the solids content of the dispersion amounts to approximately 45%, by weight.

TABLE 2

| Sample No. | Time (h) | Solids (%) | Quantity of polymer (g) | Conversion (%) | LCS latex particle diameter (nm) | Number of particles in the latex | Electrical conductivity (mS) |
|---|---|---|---|---|---|---|---|
| 1 | 1 | 4,1 | 40,3 | 0,5 | — | — | 3,8 |
| 2 | 3 | 6,4 | 490 | 6,1 | 37 | $2,1 \times 10^{19}$ | 3,6 |
| 3 | 4 | 9,2 | 1070 | 13,4 | 40 | $3,6 \times 10^{19}$ | 3,3 |
| 4 | 7 | 18,1 | 3175 | 39,7 | 45 | $7,5 \times 10^{19}$ | 3,3 |
| 5 | 12 | 30,3 | 6940 | 86,8 | 58 | $7,5 \times 10^{19}$ | 3,3 |
| 6 | 13 | 31,3 | 7305 | 91,3 | — | — | 3,2 |
| 7 | 14 | 32,5 | 7760 | 97,0 | 60 | $7,5 \times 10^{19}$ | 3,2 |

As may be seen from Table 3, middle section, the viscosity of the latex increases as a result of concentration to approximately 50,000 mPas, as measured with a Brookfield viscosimeter, No. 4 spindle, at 6 r.p.m., and to 20,000 mPas at 12 r.p.m. This latex is highly viscous and cannot be used for measurement of flow-out time in accordance with DIN 53 211.

solution contains numerous minute bubbles. Concentration is accompanied by the formation of coarse coagulate and spots, in addition to which the walls of the vessel become covered with a polymer skin.

Table 4-2 also shows the value at which the viscosity of the 32.5% latex (zero value: 12,900 mPas) settles after the addition of 0.2, 0.3, 0.4, 0.5, 0.6, 0.7 and 1.6 parts of

TABLE 3

| Dispersion | pH | Conductivity [mS] | Solids content [%] | Brookfield viscosimeter, 22° C., spindle No. rotational speed | | | | | Flow-out time according to DIN 53211 | | Latex particle diameter as measured by LCS [nm] |
|---|---|---|---|---|---|---|---|---|---|---|---|
| | | | | | 6 Upm | 12 Upm | 30 Upm | 60 Upm | sec | Duse ∅ [mm] | |
| According to B without polysulphonate | 10 | 4 | 32 | 2 | 30* | 30* | 30* | 30* | 17 | 4 | 57 |
| According to Comparison Example 1, conc., without polysulphonate | 10 | 4,3 | 45 | 4 | 50000* | 20000* | 12000* | 7000* | nicht meβbar | | 60 |
| According to Example 1 containing polysulphonate (Invention) | 10 | 5,5 | 45 | 4 | 800* | 800* | 800* | 750* | 14 | 6 | 57 |

*mPas

EXAMPLE 2 (according to the present invention)

A total of 0.16 part of said polysulphonate according to A-1 dissolved in 1.44 part of deionised water is added with stirring in stages to 100 parts of the 32.5% latex prepared in accordance with C, viscosity approximately 13,000 mPas (as measured with a Brookfield viscosimeter, No. 4 spindle, at 6 r.p.m. and at 22° C.). The viscous, foamy latex immediately becomes thinly liquid and free from bubbles on addition of the 10% polysulphonate solution.

Table 4-1 shows the reduction in viscosity when the polysulphonate solution (from 0.2 to 1.6 parts) is added in stages to the 32.5% dispersion C without concentration.

It may be seen from Table 4-2 that, after concentration of the 32.5% latex to a solids content of 40% without the addition of polysulphonate, the viscosity amounts to 56,250 mPas (No. 4 spindle, 6 r.p.m.). Concentration by distillation is laborious because the 32.5% polysulphonate solution (10%) and after concentration to 40% in each case.

The water may be distilled off quickly and without foaming from the 32.5% latex, to which 1.6 parts, by weight, of 10% polysulphonate solution have been added, up to a solids content of approximately 40%, by weight, no coagulation or agglomeration or vessel-wall coating being observed.

The concentrated, approximately 40% latex, which has remained finely particulate (from 55 to 60 nm), has a viscosity of approximately 1600 mPas, as measured with a Brookfield viscosimeter, No. 4 spindle, at 6 r.p.m. and 22° C. (cf Table 4-2) and is free flowing (flow-out time 9 seconds from an 8 mm orifice cup according to DIN 53 211).

If desired, the latex may be agglomerated with advantage in a high-pressure homogeniser under pressures of from 150 to 250 bars or by low-temperature agglomeration on rolls, resulting in the formation of dispersions having maximum particle sizes of from 250 to 500 nm.

TABLE 4

| Dispersion | Brookfield | No addition (Comparision) 0 | Addition of parts by wt. of 10% sodium alkane polysulphonate solution according to A-1 to 100 parts by wt. of dispersion | | | | | | | Latex particle diameter (LCS) [nm] |
|---|---|---|---|---|---|---|---|---|---|---|
| | | | 0,2 | 0,3 | 0,4 | 0,5 | 0,6 | 0,7 | 1,6 | |
| According to C; Example 2 Solids content 32,5% | No. 4 spindle, 22° C. viscosity in mPas at | | | | | | | | | approx. 60 |
| | 6 r.p.m. | 12900 mPas | 6100 | 4800 | 1800 | 700 | | | 20-30 | |
| | 12 r.p.m. | 8050 | 5100 | 4350 | 1750 | 700 | | | 20-30 | |
| | 30 r.p.m. | 4320 | 3280 | 3080 | 1540 | 690 | | | 20-30 | |
| | 60 r.p.m. | 2640 | 2200 | 2160 | 1200 | 710 | | | 20-30 | |
| | flow-out cup according to DIN 53211, 22° C. | | flow-out times in seconds | | | | | | | |
| | 4 mm ∅ orifice | | | | | | | | 15 | |
| | 6 mm ∅ orifice | | | | | | 14 | | | |
| | 8 mm ∅ orifice | | | | | | | | | |
| According to C; Solids content 40% by wt. Example 2 | No. 4, spindle, 22° C. viscosity in mPas at | | | | | | | | | 55 to |
| | 6 r.p.m. | 56250 53000 | 41250 | 27800 | 23300 | 18400 | 11600 | 1600 | 60 | |
| | 12 r.p.m. | 31000 28750 | 23062 | 16050 | 14050 | 11650 | 8600 | 1400 | | |
| | 30 r.p.m. | 13570 12675 | 10675 | 7600 | 6900 | 6000 | 4920 | 1250 | | |
| | 60 r.p.m. | 7420 7012 | 6037,5 | 4440 | 3960 | 3550 | 3040 | 1100 | | |

TABLE 4-continued

| Dispersion | Brookfield | No addition (Comparision) 0 | Addition of parts by wt. of 10% sodium alkane polysulphonate solution according to A-1 to 100 parts by wt. of dispersion | | | | | | | Latex particle diameter (LCS) [nm] |
|---|---|---|---|---|---|---|---|---|---|---|
| | | | 0,2 | 0,3 | 0,4 | 0,5 | 0,6 | 0,7 | 1,6 | |
| | Flow-out cup | | Flow-out times in seconds | | | | | | | |
| | 4 mm ⌀ orifice | | | | | | | | | |
| | 6 mm ⌀ orifice | | | | | | | | | |
| | 8 mm ⌀ orifice | | | | | | | 9,0 | | |

I claim:

1. A process for the production of an aqueous dispersion of one or more conjugated diene homo- and/or co-polymers, which dispersion has a viscosity of less than 50,000 mPas (1 bar/22° C.), a solids content of from 35 to 55%, by weight, and an average particle diameter of from 20 to 150 nm, which comprises concentrating an otherwise corresponding dispersion, which is free from alkane polysulphonate salts and has a lower solids content, in the presence of from 0.05 to 5%, by weight, based on the solids content thereof, of one or more water-soluble salts of one or more alkane polysulphonates.

2. A process as claimed in claim 1 in which a water-soluble salt of an alkane polysulphonate is used in the form of a from 5 to 65%, by weight, aqueous solution.

3. A process as claimed in claim 2 in which a water-soluble salt of an alkane polysulphonate is used in the form of a from 8 to 10%, by weight, aqueous solution.

4. A process as claimed in claim 1 in which a sodium or potassium salt of an alkane polysulphonate is used.

5. A process as claimed in claim 1 in which a $C_8$–$C_{22}$ alkane polysulphonate salt is used.

6. A process as claimed in claim 5 in which a $C_{13}$–$C_{17}$ alkane polysulphonate salt is used.

* * * * *